United States Patent [19]

Komatsu et al.

[11] 4,327,187

[45] Apr. 27, 1982

[54] METHOD OF PRODUCING SINTERED BODY OF CERAMICS

[75] Inventors: Michiyasu Komatsu; Akihiko Tsuge, both of Yokohama; Katsutoshi Komeya, Kanagawa; Akio Ando, Kawasaki, all of Japan

[73] Assignee: Tokyo Shibaura Denki Kabushiki Kaisha, Kawasaki, Japan

[21] Appl. No.: 122,659

[22] Filed: Feb. 19, 1980

[30] Foreign Application Priority Data

Feb. 22, 1979 [JP] Japan .................. 54-19013

[51] Int. Cl.$^3$ ................ C04B 35/50; C04B 35/58
[52] U.S. Cl. ......................... 501/97; 501/98
[58] Field of Search ............ 106/73.2, 73.4, 73.5; 264/65

[56] References Cited

U.S. PATENT DOCUMENTS

| | | | |
|---|---|---|---|
| 3,830,652 | 8/1974 | Gazza | 106/73.5 |
| 3,953,221 | 4/1976 | Lange | 106/73.5 |
| 3,969,125 | 7/1976 | Komeya et al. | 106/73.5 |
| 3,991,148 | 11/1976 | Lumby et al. | 106/73.5 |
| 4,066,468 | 1/1978 | Kamigaito et al. | 106/73.5 |
| 4,113,503 | 9/1978 | Lumby et al. | 106/73.5 |
| 4,127,416 | 11/1978 | Lumby et al. | 106/73.5 |
| 4,143,107 | 3/1979 | Ishii et al. | 106/73.5 |

FOREIGN PATENT DOCUMENTS 47-88917 12/1972 Japan .
49-128915 12/1974 Japan .

*Primary Examiner*—O. R. Vertiz
*Assistant Examiner*—Mark Bell
*Attorney, Agent, or Firm*—Oblon, Fisher, Spivak, McClelland & Maier

[57] ABSTRACT

Disclosed is a method of producing a sintered body of ceramics, wherein a powder mixture consisting, essentially, of at most 10%, exclusive of 0%, by weight of yttrium oxide, at most 10%, exclusive of 0%, by weight of aluminum oxide, at most 10%, exclusive of 0%, by weight of aluminum nitride, at most 5%, exclusive of 0%, by weight of at least one material selected from the group consisting of titanium oxide, magnesium oxide and zirconium oxide, and the balance essentially of silicon nitride is sintered under a non-oxidizing atmosphere.

8 Claims, No Drawings

METHOD OF PRODUCING SINTERED BODY OF CERAMICS

This invention relates to a method of producing a sintered body of silicon nitride-based ceramics.

A sintered body of silicon nitride-based ceramics. exhibits an excellent heat resistance; it is resistant to the heat of up to 1,900° C. In addition, the sintered body mentioned has a low thermal expansion coefficient, leading to an excellent thermal shock resistance. Thus, researches are being made in an attempt to use a sintered body of silicon nitride-based ceramics for forming machine parts requiring a high mechanical strength under high temperatures such as a gas turbine blade and nozzle. In general, such a sintered body is produced from a mixed powder of silicon nitride-yttrium oxide-aluminum oxide by a so-called "hot press method" or "normal sintering". The normal sintering is advantageous over the hot press method in that the former permits producing a sintered body of any desired shape and is suitable for mass production of a sintered body. However, it is difficult to produce dense sintered body exhibiting a satisfactory mechanical strength and heat resistance by the normal sintering. Naturally, it is a matter of serious concern in this field to develop a method which permits producing, even by the nomal sintering a dense sintered body of silicon nitride-based ceramics exhibiting a high mechanical strength and heat resistance.

An object of this invention is to provide a method which does not necessitate pressurizing in the sintering step, of producing a dense sintered body of silicon nitride-based ceramics exhibiting a high mechanical strength under high temperatures and a high thermal shock resistance.

According to this invention, there is provided a method of producing a sintered body of ceramics, wherein a powder mixture consisting essentially of at most 10% exclusive of 0%, by weight of yttrium oxide at most 10% exclusive of 0%, by weight of aluminum oxide, at most 10%, exclusive of 0%, by weight of aluminum nitride, at most 5%, exclusive of 0%, by weight of at least one material selected from the group consisting of titanium oxide, magnesium oxide and zirconium oxide, and the balance essentially of silicon nitride is sintered under a non-oxidizing atmosphere.

Each of yttrium oxide and aluminum oxide used in this invention acts as a sintering accelerator and should be used in an amount of at most 10%, exclusive of 0%, by weight. Preferably, the total amount of these materials should range between 3 and 15% by weight. If the amount of any of these materials exceeds 10% by weight, the produced sintered body fails to exhibit satisfactory mechanical strength and thermal shock resistance.

Aluminum nitride used in this invention serves to suppress evaporation of silicon nitride in the sintering process. Also, aluminum nitride reacts with the other additives so as to form a liquid phase serving to promote the sintering process. The amount of aluminum nitride should be at most 10%, exclusive of 0% by weight. If aluminum nitride is used in an amount larger than 10% by weight, the product sintered body is rendered unsatisfactory in mechanical strength and thermal shock resistance. Preferably, the total amount of aluminum nitride and aluminum oxide should be at most 15% by weight, more preferably, should range between 2 and 15% by weight.

any of titanium oxide, magnesium oxide and zirconium oxide used in this invention serves to assist the function of the sintering accelerator mentioned previously. The amount of any of these materials, or the total amount of these materials, if used in combination, should be at most 5% exclusive of 0%, by weight, preferably, should range between 0.05 and 3% by weight. Specifically, any of these materials contributes to the sintering acceleration together with yttrium oxide and aluminum oxide and, in addition, serves to improve the wettability between the main component of silicon nitride and the additives. As a result, the sintered body is enabled to exhibit a high density and the sintering time can be shortened. Further, the sintering temperature can be lowered. However, if the amount of these material 5% by weight, the produced sintered body tends to be unsatisfactory in mechanical strength under high temperatures.

In this invention, it is possible to use silicon nitride of either α-type or β-type as the main component of the raw material, though α-silicon nitride is desirable. The amount of silicon nitride, which is the balance between the total amount of the raw material and the total amount of the additives described above, should be more than 65% by weight, preferably, should range between 70 and 94% by weight.

A powder mixture of the composition described above is shaped as desired by using a binder and, then, sintered under a non-oxidizing atmosphere at 1,500° to 1,900° C. preferably, at 1,600° to 1,800° C. A rare gas like argon gas or nitrogen gas can be used as the non-oxidizing atmosphere. It is also possible to carry out the sintering under vacuum. If the sintering is carried out the sintering under vacuum. If the sintering is carried out under an oxygen-containing atmosphere, silicon nitride is oxidized into silicon dioxide, failing to obtain a sintered body exhibiting a high mechanical strength under high temperatures. A so-called "normal sintering" which does not involve pressurizing can be employed for producing a silicon nitride-based sintered body having a high density and exhibiting a high mechanical strength and thermal shock resistance under high temperatures. Of course, the sintering can be carried out under a pressure of, for example, 50 to 500 Kg/cm$^2$, i.e., hot press mthod, for producing a sintered body of satisfactory properties

EXAMPLES AND CONTROLS

Used in the experiment as the raw material were a Si$_3$N$_4$ powder containing 85% of α-Si$_3$N$_4$ and having an average particle size of 1.2μ, a Y$_2$O$_3$ powder having an average particle size of 1μ, an Al$_2$O$_3$ powder having an average particle size of 0.5μ, and an AlN powder having an average particle size of 1.5μ as well as TiO$_2$ powder, MgO powder and ZrO$_2$ powder each having an average particle size of 1μ. Various ratios of these powdery materials as shown in the following Table were mixed for 10 hours, with n-butylalcohol used as a solvent, by using a ball mill of rubber-coated balls so as to prepare 53 samples of powder mixture i ncluding Control cases.

Each powder mixture sample thus prepared was kneaded with 7% by weight of stearic acid added thereto as a binder, followed by shaping and kneaded mass under a pressure of 700 Kg/cm$^2$ into a plate 60 mm long, 40 mm wide and 10 mm thick and into disc 30 mm in diameter and 10 mm in thickness. Each of the plate and disc thus prepared was heated at 700° C. so as to remove the binder and, then, sintered at 1,700° C. under nitrogen gas atmosphere so as to obtain a silicon nitride-based sintered body of ceramics.

The following Table shows the relative density (%), flexural strength and thermal shock resistance of the sintered body. The relative density mentioned above represents the percentage of the actual density of the sintered body relative to the theoretical density thereof. The flexural strength represents the value obtained by applying a three point bend strength test to a specimen sized at 3×3×30 (mm), which was cut out from the plate-like sintered body, under a crosshead speed of 0.5 mm/min and a span of 20 mm. The flexural strength was measured at a room temperature, at 1,000° C. and at 1,200° C. The value shown in the Table represents the average of four specimens. Further, the critical thermal shock temperature ($\Delta T_C$) was measured by a so-called "water quenching method" in which a sample heated to a predetermined temperature is immersed in water so as to rapidly cool the sample, namely, the value of $\Delta T_C$ shown in the Table represents the difference between the temperature of the sample at which the sample begins to be cracked and the water temperature.

TABLE

| Sample | Component (%) | | | | | | | Relative density | Flexural strength kg/mm² | | | $\Delta T_C$ (°C.) |
| | $Si_3N_4$ | $Y_2O_3$ | $Al_2O_3$ | AlN | $TiO_2$ | MgO | $ZrO_2$ | | Room temperature | 1,000° C. | 1,200° C. | |
| --- | --- | --- | --- | --- | --- | --- | --- | --- | --- | --- | --- | --- |
| Control A | 70 | 10 | 10 | 10 | — | — | — | 98.5 | 75 | 59 | 40 | 300 |
| Control B | 85 | 5 | 5 | 5 | — | — | — | 95.8 | 83 | 70 | 60 | 400 |
| Control C | 90 | 5 | 5 | 10 | — | — | — | 96.4 | 60 | 65 | 54 | 350 |
| Control D | 88 | 5 | 2 | 5 | — | — | — | 92.0 | 45 | 47 | 50 | 450 |
| Control E | 94 | 2 | 2 | 2 | — | — | — | 85.2 | 30 | 30 | 28 | 500 |
| Control F | 80 | 10 | 5 | 5 | — | — | — | 98.0 | 65 | 60 | 52 | 400 |
| Control G | 80 | 5 | 3.5 | 3.5 | 8 | — | — | 99.8 | 90 | 69 | 45 | 375 |
| Control H | 80 | 5 | 3.5 | 3.5 | — | 8 | — | 99.6 | 88 | 64 | 40 | 375 |
| Example 1 | 75 | 10 | 5 | 5 | 5 | — | — | 99.5 | 80 | 70 | 60 | 400 |
| Example 2 | 82 | 10 | 2 | 5 | 1 | — | — | 98.8 | 75 | 72 | 65 | 475 |
| Example 3 | 78 | 5 | 2 | 10 | 5 | — | — | 97.5 | 85 | 75 | 61 | 450 |
| Example 4 | 89 | 5 | 2 | 2 | 2 | — | — | 96.2 | 91 | 75 | 67 | 475 |
| Example 5 | 87.5 | 5 | 2 | 3.5 | 2 | — | — | 99.0 | 100 | 80 | 68 | 475 |
| Example 6 | 89 | 5 | 2 | 3.5 | 0.5 | — | — | 96.1 | 90 | 80 | 78 | 550 |
| Example 7 | 87 | 5 | 3.5 | 3.5 | 1 | — | — | 99.4 | 102 | 90 | 75 | 500 |
| Example 8 | 86 | 5 | 3.5 | 3.5 | 2 | — | — | 99.6 | 99 | 80 | 67 | 450 |
| Example 9 | 87.5 | 5 | 3.5 | 3.5 | 0.5 | — | — | 98.7 | 100 | 95 | 82 | 525 |
| Example 10 | 87.5 | 2 | 3.5 | 2 | 5 | — | — | 96.2 | 85 | 70 | 60 | 400 |
| Example 11 | 78 | 10 | 2 | 5 | — | 5 | — | 99.0 | 90 | 75 | 60 | 400 |
| Example 12 | 80 | 5 | 5 | 5 | — | 5 | — | 99.8 | 95 | 80 | 62 | 400 |
| Example 13 | 89 | 5 | 2 | 2 | — | 2 | — | 97.7 | 91 | 74 | 63 | 500 |
| Example 14 | 87.5 | 5 | 2 | 3.5 | — | 2 | — | 96.6 | 96 | 72 | 66 | 550 |
| Example 15 | 88.5 | 5 | 3.5 | 2 | — | 1 | — | 97.3 | 92 | 86 | 75 | 550 |
| Example 16 | 87.5 | 5 | 3.5 | 3.5 | — | 0.5 | — | 98.9 | 95 | 90 | 80 | 500 |
| Example 17 | 76 | 10 | 2 | 10 | — | — | 2 | 99.0 | 88 | 72 | 60 | 400 |
| Example 18 | 88.5 | 5 | 2 | 3.5 | — | — | 1 | 97.5 | 95 | 93 | 70 | 525 |
| Example 19 | 79.5 | 5 | 10 | 5 | — | — | 0.5 | 99.8 | 100 | 82 | 68 | 400 |
| Example 20 | 83 | 5 | 3.5 | 3.5 | — | — | 5 | 98.5 | 99 | 85 | 62 | 450 |
| Example 21 | 87.5 | 5 | 3.5 | 3.5 | — | — | 0.5 | 98.0 | 90 | 88 | 75 | 500 |
| Example 22 | 89 | 2 | 5 | 2 | — | — | 2 | 95.8 | 80 | 78 | 68 | 475 |
| Control I | 88 | 5 | 5 | — | 2 | — | — | 95.2 | 63 | 57 | 46 | 400 |
| Control J | 88 | 5 | 5 | — | — | 2 | — | 96.0 | 63 | 59 | 47 | 400 |
| Control K | 88 | 5 | 5 | — | — | — | 2 | 92.6 | 59 | 54 | 49 | 400 |
| Example 23 | 77 | 10 | 5 | 5 | 1 | 1 | 1 | 99.2 | 89 | 72 | 60 | 400 |
| Example 24 | 87 | 2 | 5 | 2 | — | 2 | 2 | 99.0 | 80 | 70 | 62 | 450 |
| Example 25 | 85 | 5 | 2 | 5 | 2 | 1 | — | 98.5 | 95 | 83 | 70 | 425 |
| Example 26 | 85 | 5 | 3.5 | 3.5 | 1 | 1 | 1 | 98.7 | 100 | 80 | 64 | 450 |
| Example 27 | 87.75 | 5 | 3.5 | 3.5 | 0.25 | — | — | 97.5 | 98 | 95 | 82 | 550 |
| Example 28 | 87.9 | 5 | 3.5 | 3.5 | 0.1 | — | — | 96.0 | 84 | 80 | 72 | 550 |
| Example 29 | 87.75 | 5 | 2 | 5 | 0.25 | — | — | 98.2 | 105 | 99 | 81 | 550 |
| Example 30 | 90.95 | 5 | 2 | 2 | 0.05 | — | — | 95.0 | 80 | 78 | 73 | 600 |
| Example 31 | 87.75 | 5 | 3.5 | 3.5 | — | 0.25 | — | 97.8 | 100 | 84 | 70 | 500 |
| Example 32 | 87.9 | 5 | 3.5 | 3.5 | — | — | 0.1 | 96.4 | 86 | 80 | 75 | 525 |
| Example 33 | 87.85 | 5 | 3.5 | 3.5 | 0.05 | 0.05 | 0.05 | 95.9 | 88 | 84 | 76 | 575 |
| Example 34 | 87.80 | 5 | 3.5 | 3.5 | 0.1 | 0.05 | 0.05 | 98.0 | 103 | 90 | 79 | 550 |
| Example 35 | 93.9 | 2 | 2 | 2 | 0.1 | — | — | 95.0 | 80 | 78 | 70 | 600 |
| Example 36 | 89 | 5 | 5 | 0.5 | 0.5 | — | — | 97.2 | 95 | 83 | 72 | 600 |
| Example 37 | 87 | 3 | 0.5 | 7 | — | 0.5 | — | 95.1 | 80 | 80 | 70 | 525 |
| Example 38 | 87.9 | 2 | 8 | 0.1 | — | — | 2 | 96.8 | 88 | 79 | 62 | 475 |
| Example 39 | 88 | 0.5 | 7 | 3.5 | 1 | — | — | 95.9 | 81 | 78 | 65 | 500 |
| Example 40 | 87.9 | 7 | 0.1 | 3 | 2 | — | — | 95.0 | 80 | 75 | 60 | 525 |
| Example 41 | 90.5 | 5 | 1.5 | 1 | — | 2 | — | 95.2 | 79 | 74 | 68 | 500 |
| Control L | 92 | 5 | 0.5 | 0.5 | — | — | 2 | 86.3 | 50 | 42 | 30 | 475 |

The above Table shows that the method of this invention permits producing a sintered body of ceramics having a relative density of at least 95%, a flexural strength of at least 70 Kg/mm² at room temperature and at least 60 Kg/mm₂ at 1,200° C., and a critical thermal shock temperature of at least 400° C. It is important to note that the normal sintering was employed in the experiment described above. Nevertheless, the produced sintered body exhibits properties fully comparable with those of the sintered body produced by employing the hot press method.

As described above in detail, this invention provides a method of producing a dense sintered body of silicon nitride-bases ceramics exhibiting a high mechanical strength and thermal shock resistance under high temperatures. Particularly, the normal sintering, not the hot press method, can be employed for obtaining a desired sintered body.

What we claim is:

1. A sintered ceramic body having a relative density of at least 95%, a flexural strength of at least 70 Kg/mm$^2$ at room temperature and at least 60 Kg/mm$^2$ at 1200° C., and a critical thermal shock temperature of at least 400° C., produced by the process of:

admixing yttrium oxide, aluminum oxide, aluminum nitride, at least one material selected from the group consisting of titanium oxide, magnesium oxide and zirconium oxide, and silicon nitride to form a powder mixture consisting essentially of at most 10%, exclusive of 0%, by weight of yttrium oxide, at most 10%, exclusive of 0%, by weight of aluminum oxide, at most 10%, exclusive of 0%, by weight of aluminum nitride, at most 5%, exclusive of 0%, by weight of at least one material selected from the group consisting of titanium oxide, magnesium oxide and zirconium oxide, and the balance essentially of silicon nitride;

shaping said powder mixture into a desired form; and sintering under a non-oxidizing atmosphere at 1500° to 1900° C.

2. The sintered ceramic body according to claim 1, wherein the total amount of yttrium oxide and aluminum oxide ranges between 3 and 15% by weight.

3. The sintered ceramic body according to claim 1, or 2, wherein the total amount of aluminum nitride and aluminum oxide ranges between 2 and 15% by weight.

4. The sintered ceramic body according to claim 3, wherein the amount of at least one material selected from the group consisting of titanium oxide, magnesium oxide, and zirconium oxide ranges between 0.05 and 3% by weight.

5. The sintered ceramic body according to claim 1, wherein the amount of silicon nitride ranges between 70 and 94% by weight.

6. The sintered ceramic body according to claim 1, wherein the silicon nitride is α-silicon nitride.

7. The sintered ceramic body according to claim 1, wherein the powder mixture is sintered at 1600° to 1800° C.

8. The sintered ceramic body according to claim 1, wherein the non-oxidizing atmosphere is provided by at least one gas selected from the group consisting of rare gas and nitrogen gas.

* * * * *